US011893305B2

(12) United States Patent
Kulangara Muriyil et al.

(10) Patent No.: US 11,893,305 B2
(45) Date of Patent: Feb. 6, 2024

(54) SYSTEM AND METHOD FOR SYNTHETIC AUDIO GENERATION

(71) Applicant: Tata Consultancy Services Limited, Mumbai (IN)

(72) Inventors: Robin Tommy Kulangara Muriyil, Thiruvananthapuram (IN); Reshmi Ravindranathan, Thiruvananthapuram (IN); Aswathy Sreelekha Krishna, Thiruvananthapuram (IN); Rinu Michael, Thiruvananthapuram (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 149 days.

(21) Appl. No.: 17/661,889

(22) Filed: May 3, 2022

(65) Prior Publication Data
US 2023/0083346 A1    Mar. 16, 2023

(30) Foreign Application Priority Data

Aug. 13, 2021   (IN) .............................. 202121036836

(51) Int. Cl.
*G06F 3/16*       (2006.01)
*G06F 40/279*   (2020.01)
*G10K 15/02*    (2006.01)

(52) U.S. Cl.
CPC .............. *G06F 3/16* (2013.01); *G06F 40/279* (2020.01); *G10K 15/02* (2013.01)

(58) Field of Classification Search
CPC ........... G10L 13/08; G10K 15/02; G06F 3/16; G06F 40/279; G10H 7/02; G10H 2250/321; G10H 2240/395; G10H 2250/311

(Continued)

(56) References Cited

U.S. PATENT DOCUMENTS

2019/0005128 A1\* 1/2019 Barari ................ H04N 21/8153
2019/0206417 A1   7/2019 Woodruff et al.
2021/0142782 A1\* 5/2021 Wolf ........................ G06N 3/08

FOREIGN PATENT DOCUMENTS

EP            3723088 A1    10/2020

OTHER PUBLICATIONS

Artificial Intelligence Apparatus, Artificial Intelligence Server and Method for Providing Speech Including Emotion KR 20210094323 A (Siyoung et al.); Date Published: Jul. 28, 2021.\*

(Continued)

*Primary Examiner* — Melur Ramakrishnaiah
(74) *Attorney, Agent, or Firm* — FINNEGAN, HENDERSON, FARABOW, GARRETT & DUNNER LLP

(57) ABSTRACT

Embodiments provide a method and system for audio generation from contextual text input is provided. The disclosure gives due importance to the granularity of the content. The system allows the user to specify the properties of the audio to be generated. Here, context is used to identify the importance of a particular sound over the others and thus automatic adjustments of the audio output to give a more realistic feel. The system generates dataset for training audio models. The user can give input query in natural language and the audio requested will be generated for training and developing the necessary classification or other necessary audio models. The system provides a feature of automated fine-tuning of the model parameters to suit the new automatically collected training data. Furthermore, the system provides a pre-trained inbuilt model repository with audio models belonging to the main categories of noises.

6 Claims, 4 Drawing Sheets

(58) Field of Classification Search
USPC .......................................................... 700/94
See application file for complete search history.

(56) References Cited

OTHER PUBLICATIONS

Rossenbach, Nick et al., "Generating Synthetic Audio Data for Attention-Based Speech Recognition Systems", Computation and Language—Machine Learning—Audio and Speech Processing, Date: Feb. 2020, Publisher: Arxiv, http://arxiv.org/pdf/1912.09257.pdf.
Yoon, Youngwoo et al., "Speech Gesture Generation from the Trimodal Context of Text, Audio, and Speaker Identity", Graphics—Computer Vision and Pattern Recognition—Human-Computer Interaction, Date: Sep. 2020, Publisher: Arxiv, http://arxiv.org/pdf/2009.02119.pdf.

* cited by examiner

SYSTEM AND METHOD FOR SYNTHETIC AUDIO GENERATION

CROSS-REFERENCE TO RELATED APPLICATIONS AND PRIORITY

This U.S. patent application claims priority under 35 U.S.C. § 119 to India Application No. 202121036836, filed on Aug. 13, 2021. The entire content of the abovementioned application is incorporated herein by reference.

TECHNICAL FIELD

The disclosure herein generally relates to the field of natural language processing and audio generation and more specifically, to a system and method for synthetic audio file generation from contextual user inputs.

BACKGROUND

In the field of Artificial Intelligence (AI) and Machine Learning (ML), improved learning is a result of understanding gained by the machine by analyzing a lot of data related to a specific task. Data is the most essential and integral part of any AI system. In the overall process of model generation in AI, data collection, preparation and cleaning consume 60% of the overall time. There can be multiple AI modeling scenarios, which includes data ranging from structured data in the form of comma-Separated Values (CSVs) to unstructured data in Portable document formats (PDFs), images, audio, speech, video etc.

Existing systems do not provide a solution for noise or audio dataset creation by generating noise files with specifications mentioned in an input description. In existing systems, for audio/noise generation, a model is trained on a collected dataset of noise using generative adversarial network (GAN), but the generation of audio from textual input is not attempted. Moreover, customization of generated output in terms of various sound properties and the creation of synthetic datasets from synthetic data is not performed. Also, the dynamic creation of the dataset for training and dynamic parameter adjustment based on features of input received is also not performed in the existing systems.

Furthermore, the existing speech or audio models lacks focus on providing a text to audio generation engine which combines NLU, co-referencing, and correlation mapping along with speech processing. Existing models need experts for collecting a huge dataset manually for training the model. Further, most of the existing systems focus on generating a model where parameters and hyper-parameters are defined and set by a trained ML expert, but they may not focus on the granularity of the audio generated by the model. Most of the people skilled in speech processing might focus on creating a random combination of multiple sounds without considering the importance of context information to generate realistic output.

SUMMARY

Embodiments of the disclosure present technological improvements as solutions to one or more of the abovementioned technical problems recognized by the inventors in conventional systems. For example, in one embodiment, a system and method for audio generation from contextual text input is provided.

In one aspect, a processor-implemented method for audio generation from contextual text input is provided. The method includes one or more steps such as receiving a textual description with one or more details to generate an audio file. The textual description includes type of sound, predefined duration of sound required, predefined bitrate of the sound, and the sampling frequency of the audio to be generated. The received textual description are pre-processed to extract keywords using a natural language processing (NLP) model. A contextual relationship among the extracted keywords and corresponding the received textual description are determined to identify a category of the sound in the to be generated audio. Herein, the category of the sound includes a base sound and one or more background noises. It is observed that most of the people skilled in speech processing might focus on creating a random combination of multiple sounds without considering the importance of context information to generate realistic output. Herein, the context is used to identify the importance of a particular sound over the others and thus automatic adjustments of the audio output to give a more realistic feel.

Further, at least one model is selected corresponding to the identified base audio and the one or more background noises from a pre-created model repository. It is to be noted that the at least one model of the pre-created model repository is developed based on a generative adversarial network (GAN). Further, the processor-implemented method generates the audio files based on the selected at least one model. Herein, the generated audio is of predefined sampling frequency, bitrate, and duration. In addition to this, the processor-implemented method extracts a dynamic audio dataset based on the determined contextual relationship using a robotic process automation (RPA) and web scraping to create at least one new model using the extracted dynamic audio dataset for the identified base audio and the one or more background noises. Finally, the audio file is generated using the selected and trained at least one model. It would be appreciated that the selected model also takes care of the context level information and automatically adjust the amplitude and occurrence frequency of the generated audio based on the input information.

In another aspect, a system for audio generation from contextual text input is provided. The system includes an input/output interface to receive a textual description with one or more details to generate an audio file, wherein the textual description includes type of sound, duration of sound required, bitrate of the sound, and the sampling frequency of the audio file to be generated. It is to be noted that the received textual description is processed to extract keywords using a natural language processing (NLP) model. Further, the system includes one or more hardware processors and at least one memory storing a plurality of instructions, wherein the one or more hardware processors are configured to execute the plurality of instructions stored in at least one memory.

Further, the system is configured to determine a contextual relationship among the extracted keywords and corresponding the received textual description to identify a category of the sound in the audio file, and select at least one model corresponding to the identified base audio and the one or more background noises from a pre-created model repository. Herein, the least one model of the pre-created model repository is developed based on a generative adversarial network. It would be appreciated that the category of the sound includes a base sound and one or more background noises. Finally, the system is configured to generate the audio files based on the selected at least one model, wherein the generated audio file is of predefined sampling frequency, bitrate, and duration. In addition to this, the system is configured to extract a dynamic audio dataset based on the determined contextual relationship using a robotic process automation (RPA) and web scraping to create at least one new model using the extracted dynamic audio dataset for the identified base audio and the one or more background noises. It would also be appreciated that the selected model also takes care of the context level information and automatically adjust the amplitude and occurrence frequency of the generated audio based on the input information.

In yet another aspect, there are provided one or more non-transitory machine-readable information storage mediums comprising one or more instructions, which when executed by one or more hardware processors causes a method for audio generation from contextual text input is provided. The method includes one or more steps such as receiving a textual description with one or more details to generate an audio file. The textual description includes type of sound, duration of sound required, bitrate of the sound, and the sampling frequency of the audio to be generated. Further, the received textual description are pre-processed to extract keywords using a natural language processing (NLP) model. It would be appreciated that the contextual relationship among the extracted keywords are determined and corresponding the received textual description to identify a category of the sound in the to be generated audio. Herein, the category of the sound includes a base sound and one or more background noises.

Further, at least one model is selected corresponding to the identified base audio and the one or more background noises from a pre-created model repository. It is to be noted that the at least one model of the pre-created model repository is developed based on a generative adversarial network (GAN). Further, the processor-implemented method generates the audio files based on the selected at least one model. Herein, the generated audio is of sampling frequency, bitrate, and duration. In addition to this, the processor-implemented method is extracting, via the one or more hardware processors, a dynamic audio dataset based on the determined contextual relationship using a robotic process automation (RPA) and web scraping to create at least one new model using the extracted dynamic audio dataset for the identified base audio and the one or more background noises. Finally, the audio file is generated using the selected and trained at least one model. It would be appreciated that the selected model also takes care of the context level information and automatically adjust the amplitude and occurrence frequency of the generated audio based on the input information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
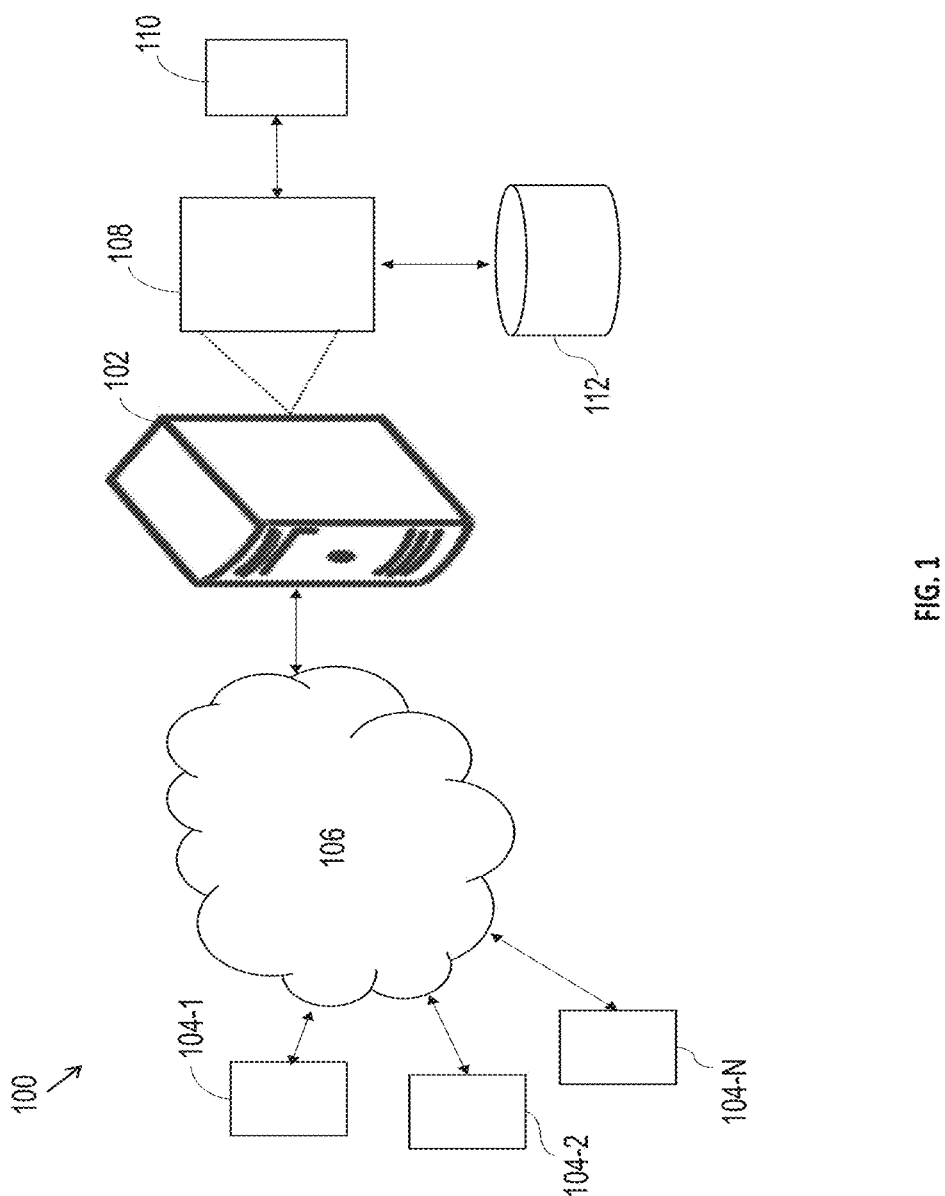
FIG. 1 illustrates a network diagram of an exemplary system for audio generation from contextual text input, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a system and method for audio generation from contextual text input. Herein, the proposed disclosure is capable of generating audio files from the input text by giving importance to natural language understanding, co-referencing, and context understanding. The proposed system and method give importance to the granularity of the content that is received as input. The system allows the user to specify the properties of the audio to be generated. The system also provides for live generation of new noise models if asked for in the query by the automatic live collection of a dataset from various sources through a robotic process automation (RPA) and self-training. Further, the system provides a feature of automated fine-tuning of the model parameters to suit the new automatically collected training data. Furthermore, the system provides a pre-trained inbuilt model repository with audio models belonging to the main categories of noises namely environment noise, human noise, office noise, household noise, automobile noise, public gathering noise and general gaussian noise.

Herein, the system involves a combination of natural language understanding (NLU), co-referencing and correlation mapping along with speech processing. The system provides live generation of new noise models if asked for in the query by the automatic live collection of a dataset from various predefined sources through RPA and self-training. The features of the automated fine-tuning of the model parameters by the system. Further, the system allows the user to specify the properties of the audio to be generated.

It would be appreciated that the system generates audio files of a specific sound category with the specifications mentioned by the user. The user gives a textual description of the type of audio to generate and its particular features. For example, let the contextual text input from user to generate an audio file with a combination of speech, and background noises like bird chirping and a man coughing for a duration of 1 hour, at a frequency of 32 KHZ, and a bit rate of 512 Kbps. It is to be noted that the system herein is provisioned to generate a single category of audio (e.g. cough sound) or a combination of multiple categories of sound (e.g. cough sound, bird sound, wrapper sound, etc.).

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system (100) for audio generation from contextual text input, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user a portable computer, a personal digital assistant, a handheld device, a smartphone, a tablet computer, a workstation, and the like. The I/O interface (104) are communicatively coupled to the system (100) through a communication network (106).

In an embodiment, the communication network (106) may be a wireless or a wired network, or a combination thereof. In an example, the communication network (106) can be implemented as a computer network, as one of the different types of networks, such as virtual private network (VPN), intranet, local area network (LAN), wide area network (WAN), the internet, and such. The communication network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the communication network (106) may include a variety of network devices, including routers, bridges, servers, computing devices, storage devices. The network devices within the communication network (106) may interact with the system (100) through communication links.

The system (100) supports various connectivity options such as BLUETOOTH®, USB, ZigBee and other cellular services. The communication network (106) environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
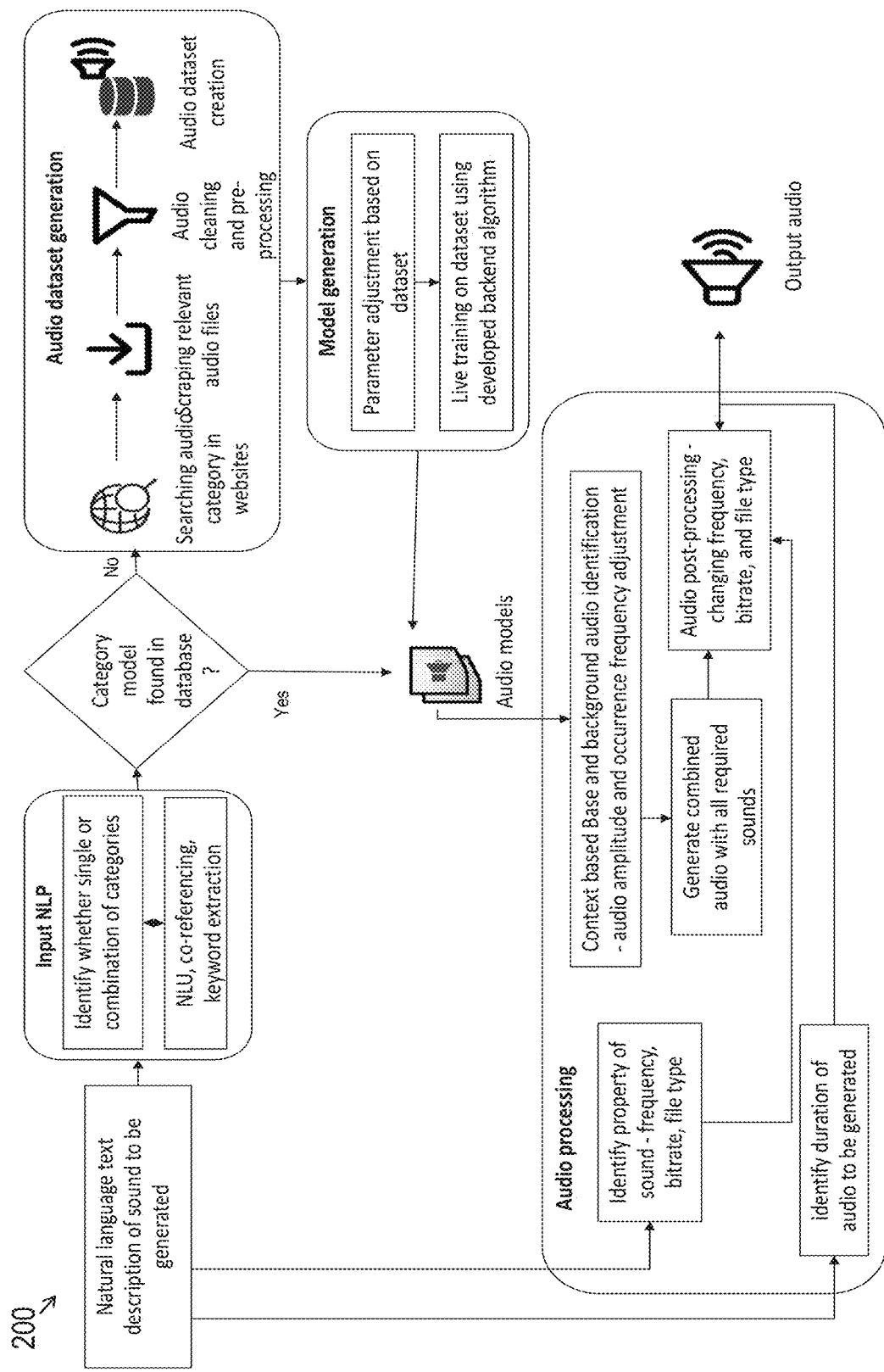
FIG. 2 is a functional block diagram to illustrate the system for audio generation from contextual text input, according to an embodiment of the present disclosure.

Referring FIG. 2, a functional block diagram (200) of the system (100) illustrating audio generation from contextual text input, in accordance with an example embodiment. The system (100) comprises at least one memory with a plurality of instructions, one or more databases (112), one or more input/output (I/O) interfaces (104) and one or more hardware processors (108) which are communicatively coupled with the at least one memory to execute a plurality of modules therein.

The one or more I/O interfaces (104) of the system (100) are configured to receive an input from a user, which is a textual description with one or more details. Herein, the one or more details include duration of the base audio, one or more background noises, duration of audio, and bitrate of the audio. Further, the textual description includes the category of sounds in the required audio file (speech, pen tapping, wrapper noise, rain sound, siren noise etc.), length of audio file to be generated (ranging from minimum 5 seconds), sampling frequency at which the audio should be generated (e.g., 8 kHz, 16 kHz, etc.), the type of audio to be generated (way, mp3 etc.), and the bit rate of the audio (8 bit, 16 bit etc.) to be generated. The one or more I/O interfaces (104) are configured to generate synthetic audio based on the textual description provided by the user via a web interface layer.

In another aspect, the system (100) is configured to pre-process the received textual description using a natural language processing (NLP) technique to extract one or more key features, and extract synonyms for the extracted each of the one or more key features. Further, the system includes a correlation model for identifying contextual relationship between the key features and their corresponding description in the input text. It would be appreciated that the relationship helps in context-based relevant content mapping to convert the natural language input from the user into the desired inputs for the system. Herein, the contextual relationship helps in identifying sound's category. There is a base sound and background noises.

In one instance, wherein considering an input to the system to generate an audio of 8 minutes duration with speech and pen tapping noise in the background, with a sampling frequency of 32 kHz and bit rate of 16 bps. Here, the key features are 8 minutes, speech, pen tapping, 32 kHz, and 16 bps. To explain about base and background noise differentiation, the user input to the system is to generate an audio file of 10 minutes duration with human speech, siren noise and sound of a customized calling bell, having a sampling frequency of 16 kHz and bit rate of 8 bits. It is understood by the intelligence of the system that the pen tapping noise should be considered as the base sound here and the siren noise as the background based on the contextual knowledge that the noise is recorded from an indoor environment where the source of the audio collection or the location of the person involved in listening to the audio is indoors. In most of the scenarios where human speech is a requirement from the user, it is considered higher priority as a base over the others.

In one example, wherein from a contextual input to create an 8 bit, 16 kHz audio file of 15 minutes duration a base audio and a background noise is identified based in NLP model of the system. It would appreciated that the base audio is always given priority by enhancing the audio by giving increased amplitude compared to background noises. Based on the audio or noise specific keywords are identified from the contextual input and corresponding audio and noise is selected from the model repository. By category, the system refers to each distinguishable audios. The sound of the audio to be generated is identified and is checked in the model repository whether a trained model is available for that sound. The repository comprises models that are trained on a generative neural network to generate specific classes for noises. If the required sound is found, then the system generates sound from that model. By checking on other attributes like frequency, duration and bitrate, the generated sound is post-processed to produce the final output.

The system (100) selects at least one model corresponding to the identified base audio and the one or more background noises from a pre-created model repository. Herein, at least one model of the pre-created model repository is developed based on a generative adversarial network (GAN). The manually created model repository is searched for similar or necessary category of audio models which can be used for the audio generation.

If a combination of noises is asked for in the system, the system may make use of generated audios from multiple models in the previously created model repository to generate the required file. If the sound asked for in the textual input is not there in the system model repository, then a new model is trained dynamically with the user uploading the dataset or samples of noise. If the user wants an automated approach, the system collects data from publicly available sources for dataset creation and proceeds with training by adjusting the parameters within the system dynamically to suit the new model training. After new training and model generation, the user can now query the model with the newly trained noises. It is to be noted that the newly generated model is added to the existing collection of model repository and be available for future query requests from any user.

In another example, wherein the model repository contains only 2 audio models of pen tapping sound and human speech. The user input to the system is to generate an audio file of 10 minutes duration with human speech, siren noise and sound of my customized calling bell, having a sampling frequency of 16 kHz and bit rate of 8 bits. In this scenario, except human speech, the 2 other requested audios in the input are not available in the repository. This calls in for the need to generate the audio models corresponding to these two new categories, i.e., siren noise and customized calling bell. Since siren noise is a common noise category, the user can opt for automatic data collection and training for that noise category. This leads to the system collecting siren noise audio files from multiple sources available on internet using robotic process automation, and thereby modifying the training parameters of the algorithm dynamically, to train and create the model for siren noise category. Once the siren noise model is created, it will be added to the inbuilt model repository along with the existing two models of human speech and pen-tapping noise.

The user input contains another requirement that is the customized calling bell sound. This model is also not available in the inbuilt model repository and hence needs to be trained. In this scenario, the user cannot choose the option to do automatic data collection, as customized calling bell is a sample which is specific to the user and requires user intervention. Here, the user collects audio samples of minimum 5 mins duration and uploads in the system for training. The parameters for fine tuning of the algorithm are dynamically chosen by the system based on the audio properties like length of audio uploaded, frequency, bitrate of the audio etc. The training is then performed on the uploaded dataset and the model for customized calling bell sound is developed. This model is then added to the inbuilt model repository and can be used for querying.

Based on the example given above, the contextual input is searched for one or more audio models in the model repository such as speech model, pen tapping sound model and bird chirping sound model. It is to be noted that inbuilt model repository comprises of manually created audio models, generated by manual collection of audio data. Manual collection of audio files includes manual generation of audio files by recording the noise made on multiple surfaces using a microphone. Further, the audio data for manual model creation can also refer to searching and collection of audios from multiple sources in internet which includes audio sources, public domain audio files, and royalty free audio files etc.

In another example, wherein the user enters an input generate an audio file of 1 hour duration where the setting is an office conference room and the noises in the background are pen tapping and ambulance siren. In this context, the system's NLP engine extracts the features of importance or the keywords of importance from the input text. The contextual analysis system identifies the context of the setting from the input received, which in this case is a conference room of office. It is understood by the intelligence of the system that the pen tapping noise should be considered as the base sound here and the siren noise as the background based on the contextual knowledge that the noise is recorded from an indoor environment where the source of the audio collection or the location of the person involved in listening to the audio is indoors. Therefore, the corresponding models of siren noise and pen tapping noise is collected from the model repository, if it's present, else it is generated. The final audio generated from the system will have the base sound (i.e. the pen tapping) in higher amplitude compared to ambulance siren as it is closer to observer/listener from the context.

Figure 3:
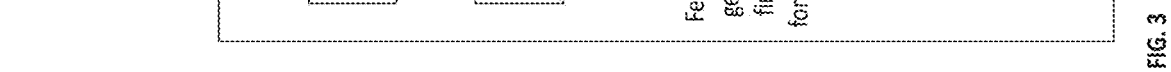
FIG. 3 is a block diagram to illustrate audio data collection and training of the generative and discriminative networks, according to an embodiment of the present disclosure.
Figure 3:
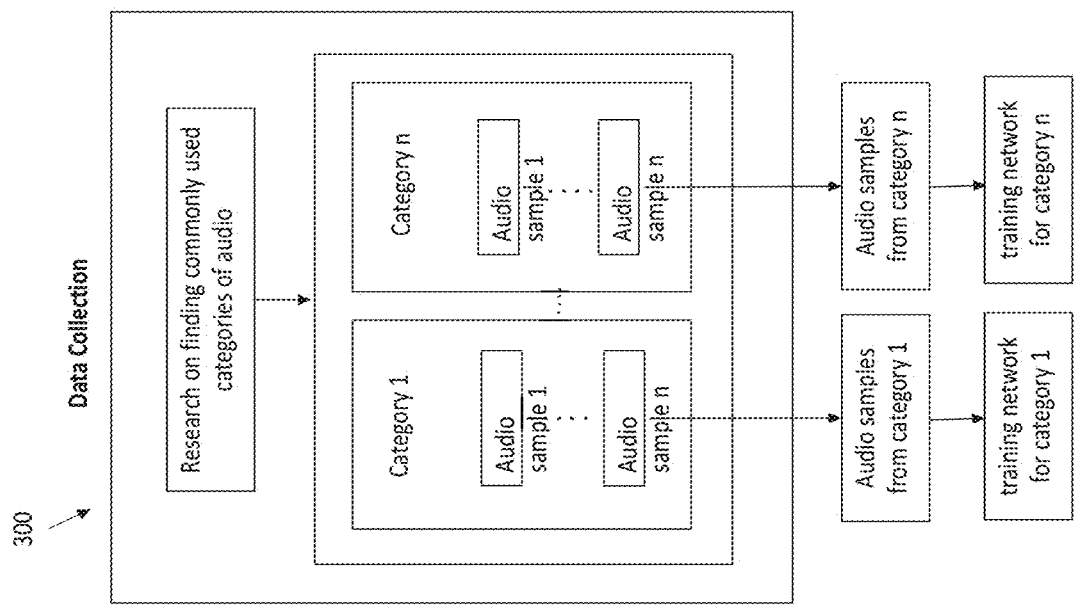

Referring FIG. 3, a block diagram (300), to illustrate an audio data collection and training of the generative and discriminative networks to develop audio generation models for inbuilt model repository, according to an embodiment of the present disclosure. Herein, the system (100) is configured to create a model architecture for synthetic audio generation. The model is based on generative adversarial networks (GAN) and works on the principle where the generator improves a random noise signal input by considering the feedback from a discriminator network. It is observed that the discriminator network discriminates the expected noise signal input from the audio generated from the generator network. This process of feedback and correction continues to reach a point where the discriminator fails to distinguish between actual and generated audio. The weights of the generator and discriminator networks are saved to create specific category of audio.

In another embodiment, wherein the audio duration requirement is fed as input to the audio models to generate audio files of required duration. While generating audios from models, the base audio is given priority over the other audio files and is considered as the continuous audio track. It would be appreciated that the background noises are generated intermittently with silence and audio in between to add up to the total duration of the audio file requirement. Further, the system (100) collects dataset automatically for training of audio models based on robotic process automation. If the user choses to upload the dataset for training, a minimal amount of 5-10 mins data is entered for the unknown class for training. If user prefers an automated approach, the system performs RPA to collect relevant data from audio sources on the internet for creating the dataset internally and create a model through training. The parameter tuning corresponding to training for each new model is handled dynamically by the system. Once the training is completed the audio model is fit to be used. The audio of the desired duration is generated from the newly trained model along with other audio combination requirements received from the user through the input text. Furthermore, if instead of the exact input requirement, if a similar category or synonym category is found in the repository, then the audio is generated from that specific audio model for the defined duration.

Figure 4:
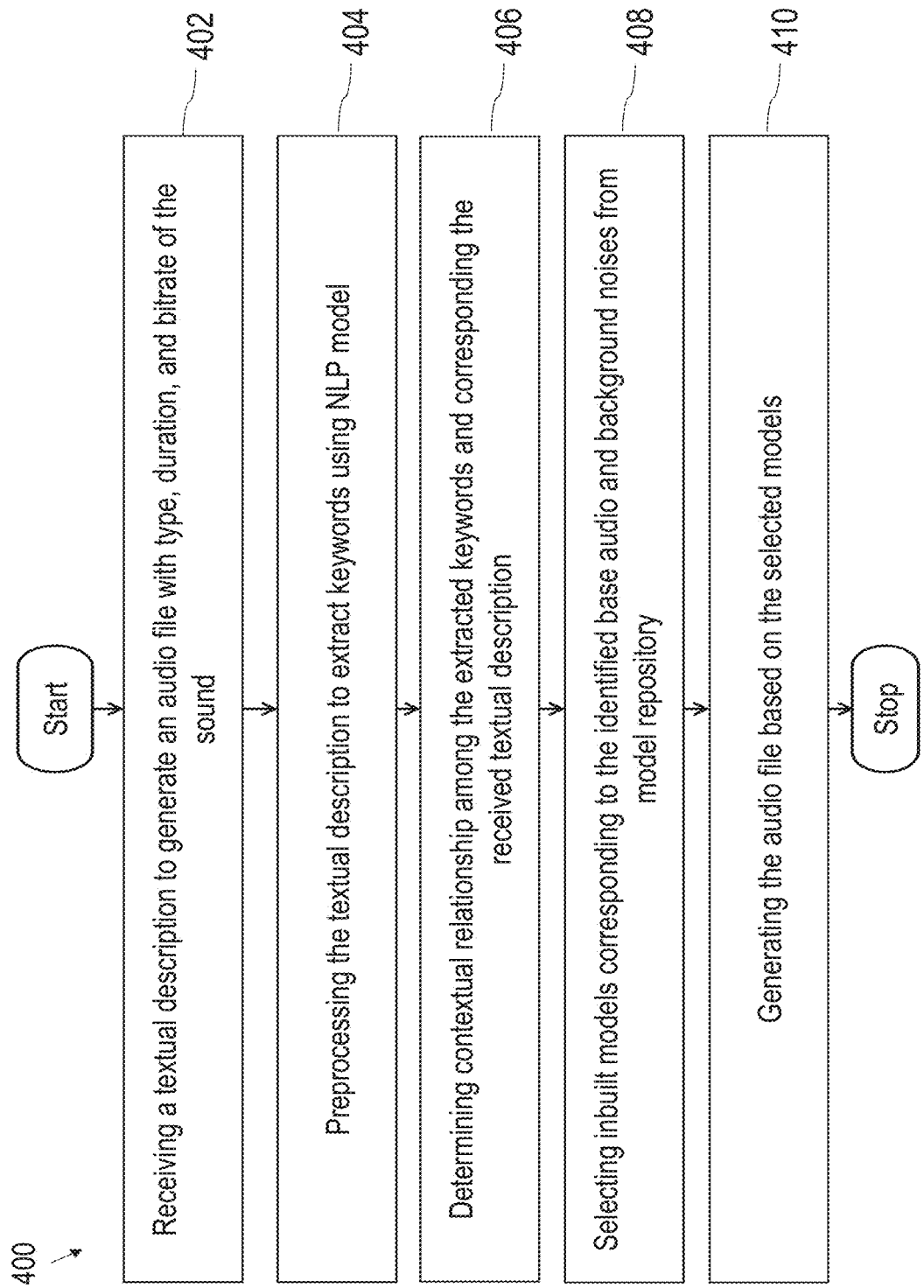
FIG. 4 is a flow diagram to illustrate a processor-implemented method for audio generation from contextual text input, according to an embodiment of the present disclosure.

Referring FIG. 4, a flow diagram (400) to illustrate a processor-implemented method for audio generation from contextual text input is provided. The user can give input query in natural language and the audio requested is generated for training and developing the necessary classification or other necessary audio models.

Initially, at the step (402), receiving a textual description with one or more details to generate an audio file, wherein the textual description includes type of sound, duration of sound required, bitrate of the sound, and the sampling frequency of the audio file to be generated.

At the step (404), pre-processing the received textual description to extract keywords using a natural language processing (NLP) model.

At the next step (406), determining a contextual relationship among the extracted keywords and corresponding the received textual description to identify a category of the sound in the audio file, wherein the category of the sound includes a base sound and one or more background noises.

At the next step (408), selecting at least one model corresponding to the identified base audio and the one or more background noises from a pre-created model repository, wherein the at least one model of the pre-created model repository is developed based on a generative adversarial network.

At the last step (410), generating the audio files based on the selected at least one model, wherein the generated audio file is of predefined sampling frequency, bitrate, and duration.

In another embodiment, the processor-implemented method extracts a dynamic audio dataset based on the determined contextual relationship using a robotic process automation (RPA) and web scraping to create at least one new model using the extracted dynamic audio dataset for the identified base audio and the one or more background noises.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of synthetic audio generation with high level granularity in terms of audio properties. Therefore, embodiments herein provide a system and method for audio generation from contextual text input. The system is configured to receive a textual description of the audio or specifically the noise that needs to be generated. The textual description must contain information like the type of sound, the duration of sound required, bitrate of the sound, and the sampling frequency of the sound file to be generated. From the textual description, the sound to be generated is identified and is checked in the model repository whether a trained model is available for that sound. The repository contains models that are trained on a generative neural network to generate specific classes for noises. If the required sound is found, then the system will generate sound from that model. By checking on other attributes like frequency, duration and bitrate, the generated sound is post-processed to produce the final output. If a combination of noises is asked for in the system will make use of generated audio from multiple models to generate the required file. If the sound asked for in the textual input is not there in the system model repository, then a new model will get trained dynamically with the user uploading the dataset or samples of noise. If the user wants an automated approach, the system collects data from publicly available sources for dataset creation and proceeds with training by adjusting the parameters within the system dynamically to suit the new model training. After new training and model generation, the user can now query the model with the newly trained noises.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
receiving, via an input/output interface, a textual description with one or more details to generate an audio file, wherein the textual description includes a type of sound, a duration of sound required, bitrate of the sound, and a sampling frequency of the audio file to be generated;
pre-processing, via one or more hardware processors, the received textual description to extract keywords using a natural language processing (NLP) technique;
determining, via the one or more hardware processors, a contextual relationship among the extracted keywords and corresponding the received textual description to identify a category of the sound in the audio file, wherein the category of the sound includes a base sound and one or more background noises;
selecting, via the one or more hardware processors, at least one model corresponding to the identified base sound and the one or more background noises from a pre-created model repository, wherein the selected at least one model of the pre-created model repository is developed based on a generative adversarial network; and
generating, via the one or more hardware processors, the audio files using the selected at least one model, wherein the generated audio file is of the predefined sampling frequency, bitrate, and duration.

2. The processor-implemented method of claim 1, further comprising:
extracting, via the one or more hardware processors, a dynamic audio dataset based on the determined contextual relationship using a robotic process automation (RPA) and web scraping; and
creating at least one new model using the extracted dynamic audio dataset for the identified base sound and the one or more background noises.

3. The system comprising:
an input/output interface to receive a textual description with one or more details to generate an audio file, wherein the textual description includes a type of sound, a duration of sound required, bitrate of the sound, and a sampling frequency of the audio file to be generated;
one or more hardware processors;
a memory in communication with the one or more hardware processors, wherein the one or more hardware processors are configured to execute programmed instructions stored in the memory, to:
pre-process the received textual description to extract keywords using a natural language processing (NLP) technique;
determine a contextual relationship among the extracted keywords and corresponding the received textual description to identify a category of the sound in the audio file, wherein the category of the sound includes a base sound and one or more background noises;
select at least one model corresponding to the identified base sound and the one or more background noises from a pre-created model repository, wherein the selected at least one model of the pre-created model repository is developed based on a generative adversarial network; and
generate the audio files using the selected at least one model, wherein the generated audio file is of the predefined sampling frequency, bitrate, and duration.

4. The system of claim 3, further comprising:
extracting a dynamic audio dataset based on the determined contextual relationship using a robotic process automation (RPA) and web scraping; and
creating at least one new model, via the one or more hardware processors, using the extracted dynamic audio dataset for the identified base sound and the one or more background noises.

5. A non-transitory computer readable medium storing one or more instructions which when executed by one or more processors on a system, cause the one or more processors to perform method comprising:
receiving, via an input/output interface, a textual description with one or more details to generate an audio file, wherein the textual description includes a type of sound, a duration of sound required, bitrate of the sound, and a sampling frequency of the audio file to be generated;
pre-processing, via one or more hardware processors, the received textual description to extract keywords using a natural language processing (NLP) technique;
determining, via the one or more hardware processors, a contextual relationship among the extracted keywords and corresponding the received textual description to identify a category of the sound in the audio file, wherein the category of the sound includes a base sound and one or more background noises;
selecting, via the one or more hardware processors, at least one model corresponding to the identified base sound and the one or more background noises from a pre-created model repository, wherein the selected at least one model of the pre-created model repository is developed based on a generative adversarial network; and
generating, via the one or more hardware processors, the audio files using the selected at least one model, wherein the generated audio file is of the predefined sampling frequency, bitrate, and duration.

6. The non-transitory computer readable medium of claim 1, further comprising:
extracting, via the one or more hardware processors, a dynamic audio dataset based on the determined contextual relationship using a robotic process automation (RPA) and web scraping; and
creating at least one new model using the extracted dynamic audio dataset for the identified base sound and the one or more background noises.

* * * * *